Oct. 3, 1967   C. ZELNICK ETAL   3,344,640
MEASURING RIBBON FORMING METHODS AND APPARATUS
Filed June 1, 1965   2 Sheets-Sheet 1
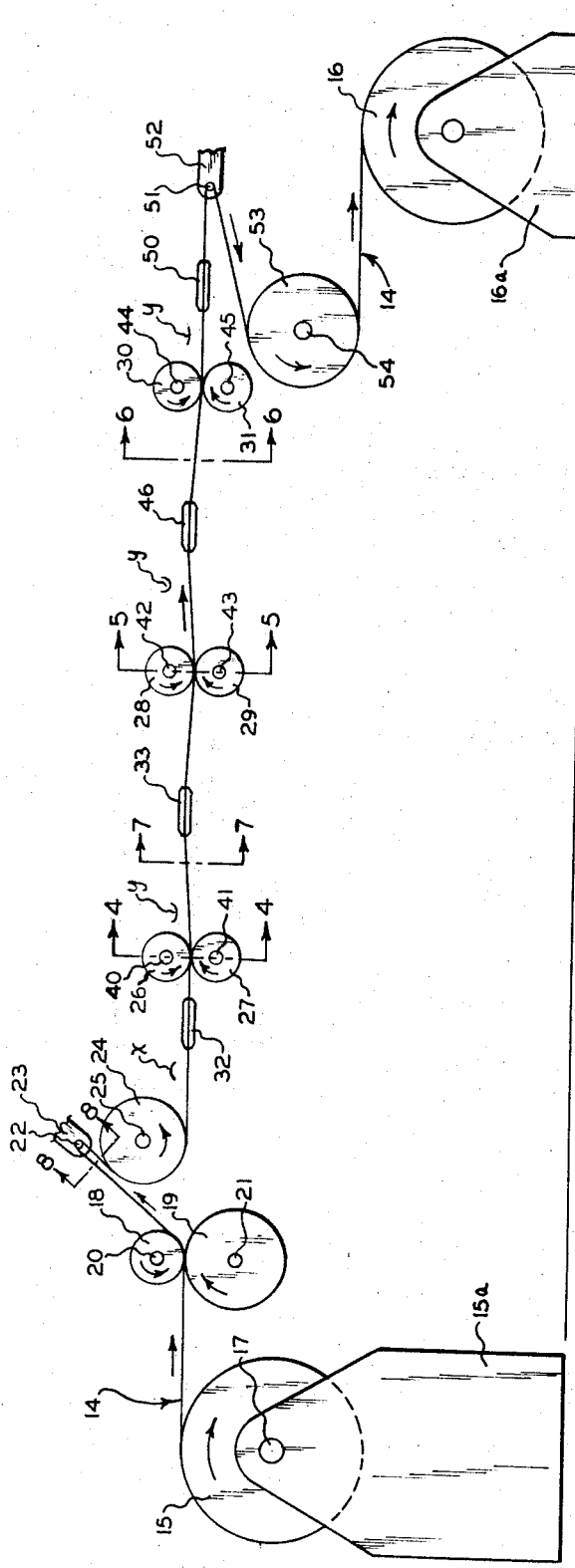
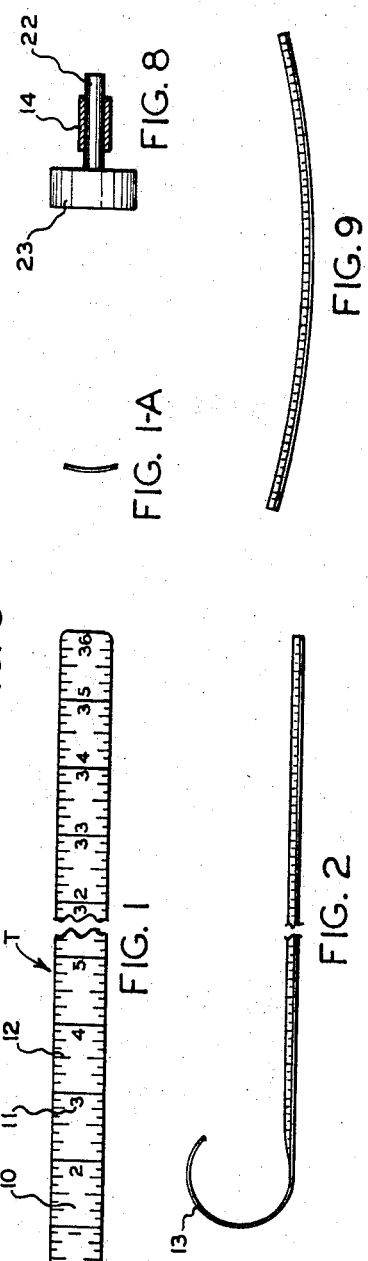
INVENTORS
CHARLES ZELNICK
ALDEN D. SWARTZ
BY
Learman, Learman & McCulloch
ATTORNEYS

INVENTORS
CHARLES ZELNICK
ALDEN D. SWARTZ
BY

Learman, Learman & McCulloch

ATTORNEYS

United States Patent Office 3,344,640
Patented Oct. 3, 1967

3,344,640
MEASURING RIBBON FORMING METHODS AND APPARATUS
Charles Zelnick, Saginaw, and Alden D. Swartz, Sebewaing, Mich., assignors, by mesne assignments, to Tintarella, S.A., Glarus, Switzerland, a corporation of Switzerland
Filed June 1, 1965, Ser. No. 460,356
13 Claims. (Cl. 72—168)

This invention relates to methods of forming ribbons suitable for use as measuring sticks of the type shown in FIGURES 17 and 18 of U.S. Foster Patent No. 2,956,795, granted Oct. 18, 1960, and to apparatus for forming measuring sticks of this character.

As pointed out in the patent mentioned, such measuring sticks may be of the self-winding, self-extending, or balanced variety. In each instance a longitudinal curvature is formed in successive lengthwise increments of the ribbon spring of a radius small enough to permanently stress the ribbon and leave a residual longitudinal stress component in the ribbon which, if permitted to assume a repose condition, would tend to wind into a tight planar coil with engaging, adjacent convolutions. Such a ribbon, if stressed only longitudinally and forcibly unwound from its coil, will have what may be referred to as an "incident" cross curvature resulting from the longitudinal stressing of the ribbon in which the concave side of the cross curvature is adjacent the coil as the ribbon is being unwound from the coil. A ribbon spring formed only with longitudinal stresses of this character would be self-winding in the sense that it would always return to coiled condition when released. However, it would return to coiled condition with such force that, if allowed to return in an uncontrolled manner, it would become entangled and would not return to a planar coil. Such a spring must be used in some type of spring motor in which it is restrained so as to prevent the aforementioned entanglement when moving from the uncoiled to coiled position, and clearly such a tape ribbon is not suitable for use as a measuring stick.

To provide a spring ribbon which may be pulled out to fully extended position and will remain in this position to prevent rewinding until the operator so desires, it is necessary to provide a cross curvature in the ribbon opposite to the "incident" cross curvature with cross component stresses which will impart sufficient stability to balance or nearly balance the residual longitudinal stress component. In a self-winding tape or stick, the condition of balance desired is such that the ribbon will remain in fully extended position until the operator simply bends one end of the ribbon in the direction in which it is normally coiled, whence the tape will slowly rewind in a controlled manner if either the free end of the ribbon, or the coil, is unrestrained. On the other hand, if the ribbon or tape is of the self-extending or balanced variety, then it will be necessary to provide sufficient force to overcome the cross component, and when this is done the ribbon will readily take the form of the coil, due to the longitudinal stress component originally imparted to the ribbon, even though the cross component normally exceeds the longitudinal component. In each instance, to provide the necessary control, the cross curvature formed in the ribbon must be opposed to the so-called "incident" curvature which the tape has due to the longitudinal stress component, and this formed cross curvature must be of sufficient magnitude to provide a resultant cross curvature in which the convex side is adjacent the convolutions of the coil as the ribbon is being wound or unwound.

It was suggested in the aforementioned patent that a cross curvature may be imparted to the ribbon prior to the coiling operation, concurrently with the coiling operation, or subsequent to the coiling operation. However, in practice no practical method for manufacturing such spring ribbons on a quantity production basis has evolved from this suggestion. No one has, to our knowledge, invented a die which would permit the imparting of a cross curvature to the ribbon opposed to the incident cross curvature at the same time as a longitudinal curvature was imparted in a concurrent operation, and cross curving either before, or after the longitudinal stressing of the ribbon simply without additional longitudinal stressing, for reasons not entirely understood, makes it impossible to uniformly achieve the substantially balanced ribbon desired.

One of the prime objects of the present invention is to provide a method and apparatus for forming measuring sticks of the character described in multiple stages which permit a relatively close control of the residual longitudinal and cross stress components imparted to the ribbon spring.

A further object of the invention is to provide a process in which a spring steel ribbon having a pigmented surface with graduations and indicia printed thereon is formed with the desired residual stress components in a continuous manner by relatively simple and reliable die and rolling elements which are capable of achieving the condition of balance desired in the finished product.

Another object of the invention is to provide a method of forming measuring sticks which are linear when extended and have no camber.

Still another object of the invention is to provide relatively simple and inexpensive apparatus for practicing the method described which permits manufacture of the measuring sticks in a most economical manner permitting their sale at a relatively low price.

Other objects and advantages of the invention will be pointed out specifically or will become apparent from the following description when it is considered in conjunction with the appended claims and the accompanying drawings, in which:

FIGURE 1 is a top plan view of a measuring stick constructed from a spring ribbon which is formed according to the method of the present invention;

FIGURE 1A is an end elevational view thereof;

FIGURE 2 is a side elevational view of the stick, illustrating the manner in which its rewinding is initiated;

FIGURE 3 is a schematic, side elevational view illustrating apparatus which is employed in practicing the invention;

FIGURE 8 is an enlarged, transverse sectional view on an enlarged scale, taken on the line 8—8 of FIGURE 3 and illustrating one of the pins for setting the longitudinal curl in the ribbon;

FIGURE 9 is a side elevational view illustrating a tapeline which, when extended to form a measuring stick, has a camber.

Figure 4:
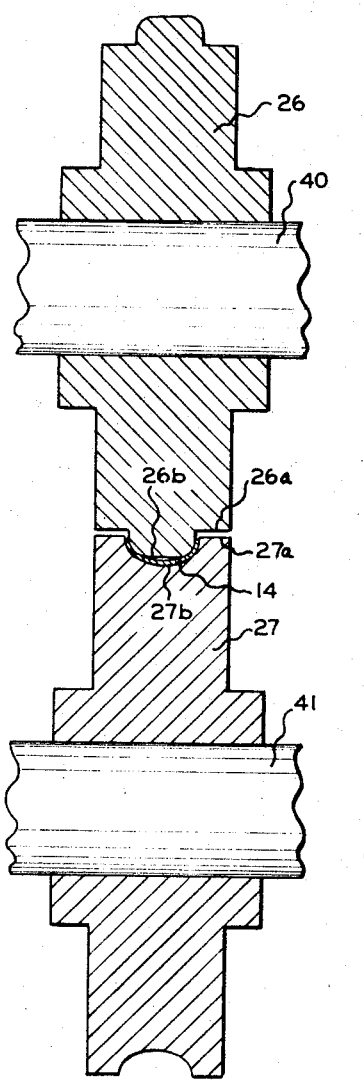
FIGURE 4 is an enlarged, transverse, sectional view taken on the line 4—4 of FIGURE 3, and illustrating the first set of cross curving rolls.

Referring now more particularly to the accompanying drawings and particularly, in the first instance, to FIGURES 1, 1A and 2, we have shown a measuring stick, generally designated T, comprising a formed spring ribbon 10 having indicia 11 and graduations 12 imprinted thereon. As shown in FIGURE 2, the tape 10 is formed with successive lengthwise increments curved in a longitudinal direction so that, when wound, the tape will coil in the manner indicated by the end 13. It will be seen from FIGURES 1A and 2 that the spring ribbon 10 is also formed with a cross curvature opposite to the incident curvature imparted by the longitudinal stress component, with the convex side of the extended end being adjacent the coil during winding and unwinding. When the tape is wound into a coil it will have no cross curvature but any portion unwound from the coil will assume the cross curvature dictated by the residual cross curvature stress component.

In practice, tape yardsticks 10 of the character illustrated are cut from a long length of ribbon which is fed continuously through processing apparatus and forms the tape in a manner to provide the longitudinal and cross curvature residual stress component balance desired. This elongate ribbon is generally indicated at 14 in FIGURE 3 and is drawn with a uniform pull from a reel 15 through certain processing stages to a powered wind-up reel 16 which may be connected to an electric motor through suitable speed reducing mechanism to permit the ribbon 14 to be drawn at a relatively slow rate of speed through the processing apparatus which will be presently described. Preferably, the ribbon 14 will be carbon spring steel in the range SAE 1075 to SAE 1110 which is capable of being stressed beyond its yield point to a condition in which it is left with both a residual cross curvature stress component and a residual longitudinal curvature stress component.

The reel 15 is revolvably mounted on a stand 15a through a suitable slip clutch mechanism 17 which slips when a certain tension is exceeded in the ribbon 14 as it is being withdrawn from reel 15 and reel 16 may be mounted on its stand 16a by a similar suitable slip clutch mechanism. As FIGURE 2 demonstrates, the tape should wind into a coil in which the graduations and numerals are inwardly disposed in protected position. From the reel 15 the ribbon 14, which has previously been imprinted with graduations and numerals, proceeds with its graduated face disposed downwardly through a pair of idler rolls 18 and 19, revolvably mounted on shafts 20 and 21, to a die pin 22 (see FIGURES 3 and 8) mounted on a fixed frame member 23. The die pin 22, which preferably is a tungsten carbide hardened steel pin about 5/32 of an inch in diameter, is so positioned with respect to an immediately downstream, idler guide roll 24 revolvably mounted on a shaft 25 that the line is pulled with tension 190° around the pin. In being pulled around the stationary pin 22, the ribbon 14 is bent beyond its yield point and is left with a residual longitudinal curvature of the character previously indicated in successive increments of its length and, if free to assume a condition of repose and properly controlled, would wind up in a tight planar coil with adjacent convolutions in relatively tight engagement. Longitudinal stressing of the ribbon in the manner indicated leaves the tape with an incident cross curvature of the nature indicated at $x$ in FIGURE 3 in which the concave side is downward.

From the guide roll 24, the tape ribbon 14 passes to the first set of rolls, 26 and 27, of a forming roll train which also includes an intermediate set of rolls, 28 and 29, and a final set of rolls, 30 and 31. The sets of rolls 26–31 may be the conventional Yoder adjustable roll trains manufactured by the Yoder Company, of Cleveland, Ohio, which are used for forming a cross curvature in steel tape lines. In the present instance, however, certain adaptations are employed to practice the invention.

It will be noted that the periphery of guide roll 24 is in horizontal alignment with the periphery 26a of forming roll 26. A guide member 32, which functions as a support or rest for the tape line 14, maintains it in this horizontal alignment as it enters the forming rolls 26 and 27. Beyond the rolls 26 and 27 is a similar guide 33 which is of the same construction as guide 32 but is positioned differently for a purpose which will be explained. The guide 33 (see FIGURE 7) comprises a frame support plate 33a mounting inner and outer plates 34 and 35, respectively, between which are secured side guide plates 36 and 37, spaced apart as at 38 to provide a tape passage opening. Bolts 39 are employed to secure the members in assembled position. In the case of the guide 33 the upper face of plate 34 is disposed a spaced distance above the periphery 26a of roll 26 and the periphery 28a of roll 28 so that the tape in passing over the resulting hump is flattened somewhat by the pull and stressed to an extent in a manner which will be described. In the case of guide 32 the opening 38 is in horizontal alignment with the nip between the peripheries 26a and 27a of rolls 26 and 27.

Figure 5:
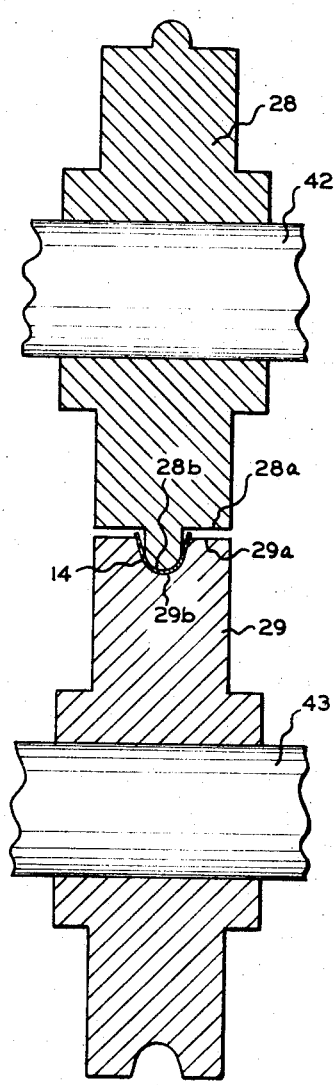
FIGURE 5 is an enlarged, transverse sectional view taken on the line 5—5 of FIGURE 3, and illustrating the second set of cross curving rolls.

The rolls 26 and 27, which are more particularly shown in FIGURE 4, include mating forming portions 26b and 27b, which roll a cross curvature in the disposition of curvature $y$ in the ribbon 14 opposite to the incident curvature $x$. In being drawn through the rolls 26 and 27, the shape of the die portions 26b and 27b is such that only the marginal edges of the tapeline are stretched transversely. When the tapeline 14 passes between the rolls 28 and 29, the central portions of the tapeline 14 are stressed transversely in the manner indicated in FIGURE 5 by the die portions 28b and 29b.

The sets of rolls 26–27, 28–29, and 30–31 are mounted on drive shafts 40–41, 42–43, and 44–45, which are driven in the direction of rotation indicated in FIGURE 3 at a rate of speed to match the speed of movement of the tape-speed imparted by a conventional electric motor to shafts 40–41, 42–43, and 44–45 is such that their tapeline engaging surfaces travel at the same rate of speed as the tapeline 14 is being pulled through the apparatus by the reel 16.

Figure 6:
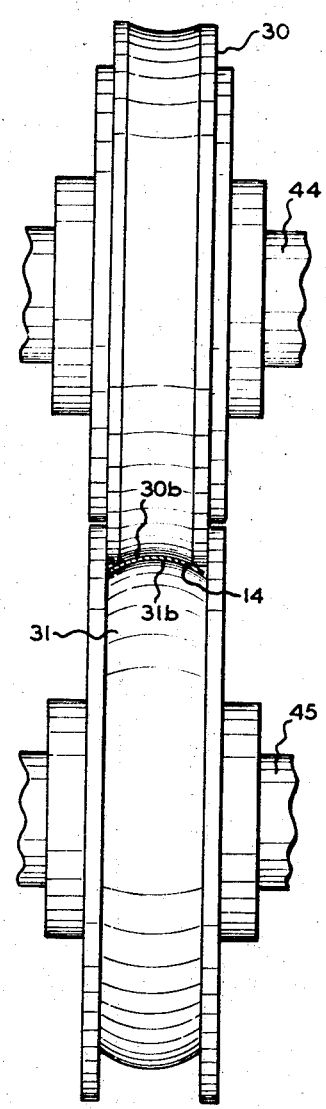
FIGURE 6 is an enlarged, transverse sectional view taken on the line 6—6 of FIGURE 3, and illustrating a third set of forming rolls.

FIGURE 6 illustrates the configuration of the drive surfaces 30b and 31b of the rolls 30 and 31 which roll the tapeline 14 in an opposite curvature and tend to break down or iron out some of the permanent cross curving stress imparted to the tapeline by the die portions 26b–27b and 28b–29b. In passing through the ironing rolls 30 and 31 shown in FIGURE 6, only the edges of the tapeline 14 are free and are not ironed out to some extent by the rolls 30–31. Of course, the reverse curvature of the die portions 30b and 31b of rolls 30 and 31 is considerably less acute, so that the tapeline is left with the cross curvature of the disposition $y$. The residual cross curvature component remaining in the tape ribbon 14 after it is passed through the sets of forming rolls is considerably greater than the incident curvature in the opposite direction previously imparted so that the resultant cross curvature is of the disposition $y$ and opposes the longitudinal stress component previously set in the tape by the pin 22. In fact, the resultant cross curvature $y$ is the result of a residual cross curvature stress component in the ribbon 14 which overbalances the longitudinal stress component previously imparted by a considerably greater margin than is desired in the finished product.

Figure 7:
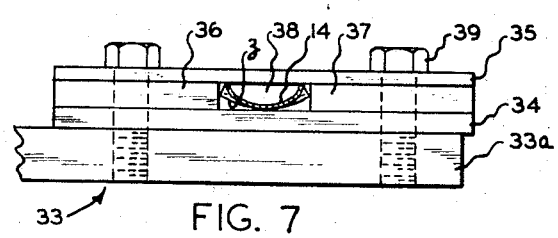
FIGURE 7 is an enlarged, transverse sectional view taken on the line 7—7 of FIGURE 3, illustrating one of the intermediate ribbon support guides.

The guide 46 between the sets of rolls 28–29 and 30–31 is of exactly the same construction as the guide 33 illustrated particularly in FIGURE 7 and is similarly positioned with the upper surface of its plate 34 above the peripheral surface 28a of the roll 28 so that the tape 14 is somewhat flattened as at $z$ as it passes over the hump created to the rolls 30 and 31 and is stressed in a manner which will be described. In FIGURE 9 we have illustrated what we mean by a tape stick having a camber. In such a measuring stick the ribbon is normal except that when it is uncoiled it does not form a linear stick and instead assumes the arcuate shape shown in FIGURE 9. Clearly, a measuring stick which has any camber is unsuited to accurately measuring lengths and distances and we find that when the tapeline is passed through rolls 26–27, 28–29 and 30–31 it unfortunately has a camber imparted to it, as well as the cross curvature which has been described. The positioning of the guides 33 and 49 in a manner such that they form a hump over which the tapeline is drawn serves to alleviate the formation of camber in the tape strip because the tapeline is thereby stressed to some degree in a camber curvature which opposes the camber curvature being set in the tapeline 14 by the rolls 26–27, 28–29, and 30–31. However, it is very difficult to do more than alleviate camber formation in this manner and we have discovered that to obtain the uniform measuring sticks we desire it is necessary to subject the tapeline to a further longitudinal curling operation.

We have further discovered that a proper balance of the residual longitudinal stress component and residual cross curvature stress component cannot be uniformly achieved without this additional longitudinal stressing of the tapeline. Accordingly, in the embodiment of the invention illustrated the tapeline proceeds from the rolls 30 and 31 through a guide 50 of the construction of FIGURE 7, which has its opening 38 so aligned with the nip between rolls 30 and 31 that it serves only as a rest or support for the tapeline and does not stress it. The tapeline is then passed around a stationary tungsten carbide pin 51, of the same diameter as pin 22, which is similarly mounted on a frame support member 52. From pin 51 the tapeline 14 passes around an idler guide roll 53 mounted on a shaft 54, and the guide roll 53 is so positioned that the extent of wraparound of the tapeline 14 is substantially 135°. It is important that the wraparound at pin 51 be less than the wraparound at pin 22 in the manner indicated and for this reason the rollers 24 and 53 are adjustably mounted on a stationary frame so that they can be readily moved to achieve the desired degree of wraparound.

Further, since batches of steel tend to vary somewhat in thickness and hardness, the rolls 26–27, 28–29, and 30–31 may be mounted for vertical adjustment and the guides 32, 33, 49 and 50 will also be mounted for vertical adjustment relative to a stationary frame. After passing around the pin 51 the tapeline 14 has been relieved of any camber. Further, the stress components within the tapeline have been reoriented and the tapeline 14 is in the balanced condition desired so that it is self-curling in the embodiment of the invention illustrated. It is believed that cross curving following initial longitudinal curving around pin 22 disorients the longitudinal stress component and that pin 51 reorients the longitudinal stress component and that this further longitudinal stressing is necessary to the achieving of a proper longitudinal and cross curvature component balance in the tape line whereby the tape may be uncoiled from its coil to measure something and, when uncoiled, assumes a cross curvature which holds it in stable, rigid, linear form so that it provides a measuring yardstick, until the cross curvature is eliminated by a longitudinal coiling of an end, as shown in FIGURE 2. The diameter which a properly formed tape stick will have in its coiled form is the diameter set into the tapeline by the pin 22. In other words, the diameter of the convolutions of the coil which any portion of the tape wound on reel 16 would assume in repose is substantially the same as the diameter of the convolutions which would be assumed by a portion of the tapeline in repose just after it has passed around pin 22. This would not be the case if the pin 51 were not employed in the manner indicated, nor would the tape be without camber.

The condition of camber is believed to result substantially from the fact that in cross curving the tapeline it is necessary to first stress only the edges of the tape on the rolls 26–27 and thence to stress only the center portions of the tape on the rolls 28–29, with the result that all portions of the tapeline are never quite stressed in the same way and to the same extent. This condition is further compounded by the rolls 30 and 31, which iron out the central portions of the tape strip 14 to some extent but do not iron out the edges. The pin 51 then is believed to reorient the stressed components to eliminate camber and provide the desired balance between the longitudinal and cross curvature stress components.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. A method of forming a ribbon spring capable of being used as a measuring stick comprising: forming a longitudinal curvature in successive lengthwise increments of a metallic ribbon of a radius sufficient to permanently stress the ribbon and cause it, if permitted to assume a repose condition, to wind into a tight coil with engaging adjacent planar convolutions; permanently stressing the ribbon to form a cross curvature in said ribbon which has a convex side toward an adjacent convolution at a time when the ribbon is in a state of winding or unwinding from coiled form; the stress imparted by the cross curvature reducing the stress imparted by the longitudinal curvature; and forming a longitudinal curvature in successive lengthwise increments of the ribbon to substantially balance the permanent stress imparted by longitudinal curvature relative to the permanent stress imparted by cross curvature.

2. The method defined in claim 1 in which the permanent stress imparted by the longitudinal curvatures is of such magnitude as to overcome the permanent stress imparted by cross curving so that the ribbon is self-coiling, if coiling is initiated by a user when the ribbon is in a stable unwound rigid form.

3. The method defined in claim 1 in which the permanent stress imparted by the longitudinal curvatures is of such magnitude as to equal the permanent stress imparted by cross curving so that the ribbon is balanced and force must be exerted to coil it.

4. The method defined in claim 1 in which the permanent stress imparted by longitudinal curving is of less magnitude than the permanent stress imparted by cross curving so that the ribbon is self-extending.

5. A method of forming a ribbon spring capable of being used as a measuring stick comprising: forming a longitudinal curvature in successive lengthwise increments of a metallic ribbon of a radius sufficient to permanently stress the ribbon and cause it, if permitted to assume a repoe condition, to wind into a tight coil with engaging adjacent planar convolutions, the permanent longitudinal curvature imparted creating an incident cross curvature which would be assumed by the ribbon when in unwound condition; permanently stressing the ribbon to form a cross curvature in the ribbon opposite to the incident cross curvature; the stress imparted by the said opposite cross curvature being of such magnitude as to overcome the incident cross curvature but not to appreciably vary the diameter or tightness of said coil the ribbon would wind into, if permitted to do so; and reimparting a permanent longitudinal curvature in successive lengthwise increments of the ribbon to supplement the permanent stress imparted by longitudinal curvature relative to the permanent stress imparted by said opposite cross curvature and remove any camber from the ribbon.

6. A method of forming a ribbon spring capable of being used as a measuring stick comprising: drawing an imprinted metallic ribbon around a die of such small diameter as to form permanent longitudinal stress components in successive lengthwise increments of the ribbon and leave the ribbon in a state such that the ribbon would form a plurality of contiguous planar convolutions in repose; passing the ribbon through a succession of cross curvature forming rolls to form cross curvature stress components in the ribbon opposing and overcoming the incident curvature caused by longitudinal stressing, with the permanent cross curvature stress component created being greater than the permanent longitudinal stress component; drawing the ribbon around a second die of such small diameter as to permanently restress the ribbon in the longitudinal direction and eliminate any camber in the ribbon; and cutting the ribbon into suitable lengths.

7. The combination defined in claim 6 in which the dies are of substantially the same diameter but the ribbon wraps around the first mentioned die to a greater degree than it wraps around said second die.

8. The combination defined in claim 7 in which the diameter of the dies is about 5/32" and the wrap around the first mentioned die is about 190° and around said second die about 135°.

9. A method of forming a ribbon spring capable of being used as a measuring stick comprising: drawing a metallic ribbon around a die of such small diameter as to form longitudinal stress component in successive lengthwise increments of the ribbon and leave the ribbon in a state such that the ribbon would form a plurality of contiguous planar convolutions in repose; passing the ribbon through a succession of cross curvature forming rolls to form cross curvature stress components in the ribbon opposing and overcoming the incident curvature caused by longitudinal stressing, with the residual cross curvature stress component created by reducing the longitudinal stress component being greater than the residual longitudinal component following cross curving; and drawing the ribbon around a die of such small diameter as to increase the longitudinal stress component to the point that the formed cross curvature stress component just overbalances the incident cross curvature stress component, without substantially changing the diameter of the convolutions of the coil the ribbon forms from the diameter of the convolutions previously set in the ribbon.

10. A method of forming a ribbon spring capable of being used as a measuring stick comprising: drawing a metallic ribbon around a die of such small diameter as to form longitudinal stress component in successive lengthwise increments of the ribbon and leave the ribbon in a state such that the ribbon would form a plurality of contiguous planar convolutions in repose; passing the ribbon through a succession of cross curvature forming rolls to form cross curvature stress components in the ribbon opposing and overcoming the natural curvature caused by longitudinal stressing, with the cross curvature stress component created reducing the longitudinal stress component and being greater than the said longitudinal component; permanently stressing the ribbon as it passes between the succession of forming rolls by drawing it over hump means projecting in a direction to alleviate the camber formed in the ribbon in the forming rolls; and drawing the ribbon around a die of such small diameter as to reorient the longitudinal stress component and eliminate residual camber.

11. Apparatus for forming a ribbon spring capable of being used as a measuring stick comprising: means for drawing a metallic ribbon through the apparatus; die means forming the ribbon to such small diameter as to form a longitudinal stress component in successive lengthwise increments of the ribbon and leave the ribbon in a state such that the ribbon would form a plurality of contiguous planar convolutions in repose; cross curvature forming means downstream of said die means to form cross curvature stress components in the ribbon opposing and overcoming the natural curvature caused by longitudinal stressing, with the cross curvature forming means configured so that the cross curvature stress component created reduces the longitudinal stress component and is greater than the said longitudinal component; and second die means receiving the ribbon and forming it to such small diameter as to provide an increased longitudinal stress component in the ribbon.

12. Apparatus for forming a ribbon spring capable of being used as a measuring stick comprising: means for drawing a metallic ribbon through the apparatus; die means of such small diameter as to form a longitudinal stress component in successive lengthwise increments of the ribbon and leave the ribbon in a state such that the ribbon would form a plurality of contiguous planar convolutions in repose; a succession of cross curvature forming rolls to form cross curvature stress components in the ribbon opposing and overcoming the natural curvature caused by longitudinal stressing, with the rolls configured so that the cross curvature stress component created reduces the longitudinal stress component and is greater than the said longitudinal component; means forming a hump between said succession of rolls projecting in a direction to alleviate the camber formed in the ribbon in the forming rolls; and second die means downstream from said rolls of such small diameter as to form an increased longitudinal stress component in the ribbon.

13. The combination defined in claim 12 in which means is provided for wrapping the ribbon around said first mentioned die means to a greater degree than around said second die means.

References Cited

UNITED STATES PATENTS

| | | | |
|---|---|---|---|
| 2,717,626 | 9/1955 | Sherwood | 72—166 |
| 2,854,056 | 9/1958 | Stanius | 72—168 |
| 3,117,036 | 1/1964 | Cleland et al. | 72—181 |
| 3,145,759 | 8/1964 | Zelnick et al. | 72—169 |

CHARLES W. LANHAM, *Primary Examiner.*

R. D. GREFE, *Examiner.*